(12) United States Patent
Sand

(10) Patent No.: US 9,707,717 B2
(45) Date of Patent: Jul. 18, 2017

(54) THIXOTROPIC, THERMOSETTING RESINS FOR USE IN A MATERIAL EXTRUSION PROCESS IN ADDITIVE MANUFACTURING

(71) Applicant: Georgia-Pacific Chemicals LLC, Atlanta, GA (US)

(72) Inventor: Irving D. Sand, Ellenwood, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 11 days.

(21) Appl. No.: 15/133,457

(22) Filed: Apr. 20, 2016

(65) Prior Publication Data

US 2016/0271872 A1 Sep. 22, 2016

Related U.S. Application Data

(63) Continuation of application No. 14/952,999, filed on Nov. 26, 2015.

(60) Provisional application No. 62/085,316, filed on Nov. 27, 2014.

(51) Int. Cl.
| | |
|---|---|
| *B29C 67/24* | (2006.01) |
| *B29C 67/00* | (2017.01) |
| *B33Y 70/00* | (2015.01) |
| *B29C 35/08* | (2006.01) |
| *B33Y 10/00* | (2015.01) |
| *B29K 101/10* | (2006.01) |
| *B29K 105/00* | (2006.01) |

(52) U.S. Cl.
CPC ...... *B29C 67/0055* (2013.01); *B29C 35/0805* (2013.01); *B29C 67/24* (2013.01); *B33Y 70/00* (2014.12); *B29K 2101/10* (2013.01); *B29K 2105/0094* (2013.01); *B33Y 10/00* (2014.12)

(58) Field of Classification Search
CPC ............ B29C 67/0055; B29C 67/0051; B29C 67/0081
USPC ...................................................... 264/471
See application file for complete search history.

(56) References Cited

U.S. PATENT DOCUMENTS

| | | | |
|---|---|---|---|
| 5,121,329 A | 6/1992 | Crump | |
| 5,866,058 A | 2/1999 | Batchelder et al. | |
| 6,067,480 A | 5/2000 | Stuffle et al. | |
| 6,508,980 B1 | 1/2003 | Sachs et al. | |
| 2002/0026982 A1 | 3/2002 | Bredt et al. | |
| 2005/0079086 A1 | 4/2005 | Farr et al. | |
| 2006/0231982 A1* | 10/2006 | You .................. | B29C 41/003 264/496 |
| 2009/0020901 A1* | 1/2009 | Schillen .......... | B29C 67/0051 264/31 |
| 2014/0284832 A1 | 9/2014 | Novikov et al. | |
| 2015/0239179 A1 | 8/2015 | Goto et al. | |
| 2015/0291833 A1 | 10/2015 | Kunc et al. | |

FOREIGN PATENT DOCUMENTS

| | | |
|---|---|---|
| FR | 3029811 A1 | 6/2016 |
| WO | 2004018185 A1 | 3/2004 |
| WO | 2014056482 A1 | 4/2014 |

OTHER PUBLICATIONS

Mahajan, C. and Cormier, D.; 3D Printing of Carbon Fiber Composites with Preferentially Aligned Fibers, Proceedings of the 2015 Industrial and Systems Engineering Research Conference, S. Cetinkaya and J. K. Ryan Eds.
Ziemian, S., Okwara, M. and Ziemian, C.; Tensile and fatigue behavior of layered acrylonitrile butadiene styrene, Rapid Prototyping Journal, vol. 21 Issue 3 pp. 270-278.
International Search Report and Written Opinion for International Application No. PCT/US2015/062820 mailed Feb. 23, 2016.

* cited by examiner

*Primary Examiner* — Christina Johnson
*Assistant Examiner* — Xue Liu
(74) *Attorney, Agent, or Firm* — Ram W. Sabnis

(57) ABSTRACT

Methods of preparing a three-dimensional structure are provided. One method includes the steps of extruding beads of thixotropic thermoset materials, and subjecting the beads to curing conditions such that the thixotropic thermoset materials at least partially cure to form cured polymer layers. In some cases, the curing conditions are not applied until multiple beads are extruded and in contact with one another. The steps of these methods can be performed repeatedly as desired to prepare a three-dimensional structure of nearly limitless shapes by additive manufacturing processes. Thixotropic thermoset materials are also provided, as are three-dimensional objects formed therefrom.

16 Claims, No Drawings

THIXOTROPIC, THERMOSETTING RESINS FOR USE IN A MATERIAL EXTRUSION PROCESS IN ADDITIVE MANUFACTURING

CROSS REFERENCE TO RELATED APPLICATION

This application is a continuation of U.S. patent application Ser. No. 14/952,999, filed 26 Nov. 2015, which claims the benefit of U.S. Provisional Application No. 62/085,316, filed 27 Nov. 2014, the disclosures of which are hereby incorporated herein by reference as if fully set forth below.

FIELD OF THE INVENTION

The present invention is directed to additive manufacturing and the use of thermoset resins in additive manufacturing processes.

BACKGROUND OF THE INVENTION

Additive manufacturing has been used for many years. Fabricated parts have been produced using various printing techniques (e.g., three-dimensional or 3-D printing techniques). For example, sheet welding, wire welding, melting in powder beds or powder deposition via laser and electron beam melting, injections using powder, liquid ultraviolet curable resins, and fusible thermoplastic filaments have all been used. These techniques have varying degrees of geometric complexity, but generally have few restrictions in comparison to conventional machining. Each type of technique has associated with it advantages and disadvantages, particularly with respect to solid state processing, fine grain structures, and mechanical properties.

Selective laser sintering (SLS) is a powder-based layer additive manufacturing process in which laser beams, either continuous or pulse mode, are used as a heat source for scanning and joining powders in predetermined sizes and shapes of layers via a polymer binder. The geometry of the scanned layers corresponds to the various cross-sections of the computer-aided design (CAD) models. A drawback of SLS is that additional powder at the boundaries is often hardened and remains attached to the part, thereby requiring additional finishing steps to remove the unwanted material. Furthermore, an inert atmosphere is often required, increasing the cost of the equipment.

Other known processes of additive manufacturing are based on a fluidic or liquid resin layer that is selectively solidified to construct a part layer-by-layer. One such process is known as stereolithography (SLA). SLA uses a vat of liquid ultraviolet curable photopolymer "resin" and an ultraviolet laser to build parts' layers one at a time. The laser beam traces a cross-section of the part pattern on the surface of the liquid resin. The UV exposure cures and solidifies the pattern traced on the resin and joins it to the layer below. After the pattern has been traced, an elevator platform supporting the vat containing the resin descends a distance equal to the thickness of the single layer. A new layer of liquid resin then forms over the part to form a new liquid surface. A subsequent layer pattern is then traced, joining the previous layer. This process is repeated to form a 3-dimensional part. The completed part is washed in a chemical bath to remove excess resin. The part is then photocured in an ultraviolet oven. Although SLA can be used to prepare parts having a variety of different shapes, the ultraviolet curable photopolymer resin can be quite expensive, and due to the complexity of the SLA equipment, the machines costs may be prohibitively expensive. Further, photocuring is limited in terms of thickness of the part that can be cured due to the photon gradient parallel to the direction of the radiation source that arises from the absorption of the radiation that must occur to effect curing.

Material extrusion is another additive manufacturing process that utilizes a fluid resin to build a part layer-by-layer. In this process, a part is formed by the extrusion of small beads of a molten thermoplastic material that fuse to each other to form layers of the part. The molten thermoplastic material hardens by cooling below its melting temperature or glass transition temperature after extrusion from a mobile nozzle. Typically, the nozzle heats the thermoplastic material above its glass transition temperature, and for crystalline or semi-crystalline material, above the melting point. The molten material is then deposited by an extrusion head. Examples of thermoplastic materials that are used in material extrusion include, acrylonitrile-butadiene-styrene (ABS), polylactic acid, polycarbonate, polyamides, polystyrene, and lignin. Material extrusion was first developed by Stratays, Inc. and is also known under the trademark FUSED DEPOSITION MODELING™.

While material extrusion generally provides an effective process for building a part, it does have some disadvantages. First, prior to adding a successive layer, the previously built layer needs to sufficiently cool and solidify. Second, the part may have lower strength in the Z-direction (e.g., between successive layers) due to poor entanglement of polymer chains between successive layers. In addition, for many thermoplastics, such as ABS, it is necessary to first dry the resin prior to extrusion.

Accordingly, a need still exists for new resins and processes to be used in additive manufacturing.

SUMMARY OF THE INVENTION

In embodiments, the subject matter disclosed herein is directed to methods of preparing three-dimensional structures. More specifically, embodiments of the invention are directed to methods of manufacturing parts in which successive layers of a thixotropic thermoset material are successively deposited onto one another to form a part.

The thixotropic thermoset material comprises a thermoset resin to which a rheology control agent has been added. The rheology control agent renders the thermoset resin thixotropic so that the material is capable of being extruded through a nozzle to form a bead on a surface that retains its shape upon being deposited and does not flow after deposition on the surface at the point where mechanical shear stresses are removed.

As a result, successive layers of the thixotropic thermoset material may be deposited essentially without any change in geometry. When curing conditions are applied after successive layers have been deposited, the polymer chains of adjacent contacting layers crosslink with each other during a curing step to form a part having improved strength in the z-direction of the part.

In contrast, many prior art methods of additive manufacturing, such as those utilizing thermoplastics, require that a preceding layer is sufficiently cool and hardened prior to depositing a subsequent layer. As a result, entanglement of the polymer chains between adjacent layers is non-existent or limited at best, which in return results in lower strength in the z-direction of the manufactured part.

One method comprises i. extruding a first bead of a first thixotropic thermoset material onto a support, wherein the first thixotropic thermoset material comprises a first thermoset resin and a first rheology control agent; ii. subjecting the first bead to curing conditions such that the thixotropic thermoset material is at least partially cured to form a cured first polymer layer; iii. extruding a second bead of a second thixotropic thermoset material in contact with the cured first polymer layer, wherein the second thixotropic thermoset material comprises a second thermoset resin and a second rheology control agent; and iv. subjecting the second bead of thixotropic thermoset material to curing conditions, wherein the second bead of thixotropic thermoset material is at least partially cured to form a cured second polymer layer, and wherein the three-dimensional structure is prepared.

The steps of the method can be performed repeatedly as desired to prepare a three-dimensional structure of nearly limitless shapes.

In one embodiment of such a method, the first and/or second thixotropic thermoset material has a thixotropic index that is greater than 5. Specifically, the first and/or second thixotropic thermoset material can have a thixotropic index that is 10 or higher. More specifically, the first and/or second thixotropic thermoset material can have a thixotropic index that is 15 or higher. Even more specifically, the first and/or second thixotropic thermoset material can have a thixotropic index that is 20 or higher. Yet more specifically, the first and/or second thixotropic thermoset material can have a thixotropic index that is 25 or higher.

In the same or another embodiment of such a method, the first and/or second thermoset resin is selected from the group consisting of phenolic resins; lignin resins; tannin resins; amino resins; polyimide resins; isocyanate resins; (meth) acrylate resins; vinylic resins; styrenic resins; polyester resins; melamine resins; vinyl ester resins; maleimide resins; epoxy resins; polyamidoamine resins; and mixtures thereof. More specifically, the first and/or second thermoset resin can be selected from the group consisting of phenolic resins, amino resins, epoxy resins, isocyanate resins, and acrylate resins.

In the same or another embodiment of such a method, the phenolic resin can have a mole ratio of formaldehyde to phenol of about 2:1 to about 3:1.

In the same or another embodiment of such a method, the phenolic resin can have a crosslinker and a 0.6 to 0.9 ratio of formaldehyde to phenol.

In the same or another embodiment of such a method, the amino resins can be resins having a mole ratio of formaldehyde to urea from about 2.2:1 to about 3.8:1.

In the same or another embodiment of such a method, the first cured polymer layer is cross-linked with the second cured polymer layer.

In the same or another embodiment of such a method, the first and/or second thixotropic thermoset material is capable of flowing when subjected to an external shear stress and at zero shear rate having a yield strength or yield point such that the first and/or second thixotropic thermoset material does not flow.

In the same or another embodiment of such a method, the steps of subjecting the first or second beads to curing conditions comprise irradiating the first or second bead with thermal energy.

In the same or another embodiment of such a method, the steps of subjecting the first or second bead to curing conditions comprise subjecting the first or second bead to visible or invisible light, UV-radiation, IR-radiation, electron beam radiation, X-ray radiation or laser radiation.

In the same or another embodiment of such a method, the first and/or second rheology control agent comprises fumed silica, organoclays, polysaccharides, cellulose and derivatives thereof.

In the same or another embodiment of such a method, the steps of extruding a first or second bead of the first or second thixotropic thermoset material comprise subjecting the first or second thixotropic thermoset material to an external shear stress to cause the first or second thixotropic thermoset material to be extruded through an extrusion nozzle.

In the same or another embodiment of such a method, the first thixotropic thermoset material has the same composition as the second thixotropic thermoset material.

In the same or another embodiment of such a method, the first and/or second thixotropic thermoset material is extruded through a heated nozzle that initiates curing of the first and/or second thixotropic thermoset material.

In the same or another embodiment of such a method, steps ii. and iv. result in the cured first polymer layer and cured second polymer layer, respectively, being only partially cured to allow for subsequent crosslinking between the first and second layers.

Another method comprises: i. extruding a first bead of a first thixotropic thermoset material onto a support, wherein the first thixotropic thermoset material comprises a first thermoset resin and a first rheology control agent, and wherein the first thixotropic thermoset material has a thixotropic index that is greater than 5; ii. extruding a second bead of a second thixotropic thermoset material, wherein the second bead is in contact with the first bead, wherein the second thixotropic thermoset material comprises a second thermoset resin and a second rheology control agent, and wherein the second thixotropic thermoset material has a thixotropic index that is greater than 5; and iii. subjecting the first and second beads to curing conditions to form cured first and second polymer layers, respectively, wherein the cured first polymer layer is cross-linked with the cured second polymer layer, and wherein the three-dimensional structure is prepared.

In one embodiment of such a method, the method further includes successively repeating steps i. and ii, prior to step iii to form the three-dimensional structure comprising a plurality of cured polymer layers, wherein adjacent cured polymer layers are cross-linked with each other.

In the same or another embodiment of such a method, the step of subjecting the first and second beads to curing conditions comprises heating the first and second beads to a temperature ranging from about 25 to about 125° C.

In the same or another embodiment of such a method, the first and/or second thermoset resin is selected from the group consisting of phenolic resins; lignin resins; tannin resins; amino resins; polyimide resins; isocyanate resins; (meth) acrylate resins; vinylic resins; styrenic resins; polyester resins; melamine resins; vinyl ester resins; maleimide resins; epoxy resins; polyamidoamine resins; and mixtures thereof. More specifically, the first and/or second thermoset resin can be selected from the group consisting of phenolic resins, amino resins, epoxy resins, isocyanate resins, and acrylate resins.

In the same or another embodiment of such a method, the phenolic resin can have a mole ratio of formaldehyde to phenol of about 2:1 to about 3:1.

In the same or another embodiment of such a method, the phenolic resin can have a crosslinker and a 0.6 to 0.9 ratio of formaldehyde to phenol.

In the same or another embodiment of such a method, the amino resins can be resins having a mole ratio of formaldehyde to urea from about 2.2:1 to about 3.8:1.

In the same or another embodiment of such a method, the first and/or second thixotropic thermoset material is capable of flowing when subjected to an external shear stress and at zero shear rate having a yield strength or yield point such that the first and/or second thixotropic thermoset material does not flow.

In the same or another embodiment of such a method, the steps of subjecting the first or second beads to curing conditions comprise irradiating the first or second bead with thermal energy.

In the same or another embodiment of such a method, the steps of subjecting the first or second bead to curing conditions comprise subjecting the first or second bead to visible or invisible light, UV-radiation, IR-radiation, electron beam radiation, X-ray radiation or laser radiation.

In the same or another embodiment of such a method, the first and/or second rheology control agent comprises fumed silica, organoclays, polysaccharides, cellulose and derivatives thereof.

In the same or another embodiment of such a method, the steps of extruding a first or second bead of the first or second thixotropic thermoset material comprise subjecting the first or second thixotropic thermoset material to an external shear stress to cause the first or second thixotropic thermoset material to be extruded through an extrusion nozzle.

In the same or another embodiment of such a method, the first thixotropic thermoset material has the same composition as the second thixotropic thermoset material.

In the same or another embodiment of such a method, the first and/or second thixotropic thermoset material is extruded through a heated nozzle that initiates curing of the first and/or second thixotropic thermoset material.

One thixotropic thermoset material comprises a thermoset resin and a rheology control agent, wherein the thixotropic thermoset material is capable of flowing when subjected to an external shear stress and exhibits little to no lateral flow when in a static state, and wherein the thixotropic thermoset material has a thixotropic index that is greater than 5.

In one embodiment of such a material, the thermoset resin is selected from the group consisting of phenolic resins; lignin resins; tannin resins; amino resins; polyimide resins; isocyanate resins; (meth)acrylate resins; vinylic resins; styrenic resins; polyester resins; melamine resins; vinyl ester resins; maleimide resins; epoxy resins; polyamidoamine resins; and mixtures thereof. More specifically, the thermoset resin can be selected from the group consisting of phenolic resins, amino resins, epoxy resins, isocyanate resins, and acrylate resins.

In the same or another embodiment of such a method, the phenolic resin can have a mole ratio of formaldehyde to phenol of about 2:1 to about 3:1.

In the same or another embodiment of such a method, the phenolic resin can have a crosslinker and a 0.6 to 0.9 ratio of formaldehyde to phenol.

In the same or another embodiment of such a method, the amino resins can be resins having a mole ratio of formaldehyde to urea from about 2.2:1 to about 3.8:1.

In the same or another embodiment of such a material, rheology control agent comprises fumed silica, organoclays, polysaccharides, cellulose and derivatives thereof.

The material can be used to form a three-dimensional object.

One three-dimensional object comprises a plurality of layers each built at least partially on top of another, and in which each layer defines a cross section of the three-dimensional object, and wherein each layer comprises a cured polymeric material in which a polymer chain of a given layer is crosslinked with a polymer chain of an adjoining layer.

In one embodiment of such an object, the cured polymeric material is derived from a thixotropic thermoset material. The thixotropic thermoset material can, as defined above, comprise a thermoset resin and a rheology control agent. The thixotropic thermoset material can be capable of flowing when subjected to an external shear stress and exhibits little to no lateral flow when in a static state, and the thixotropic thermoset material can have a thixotropic index that is greater than 5.

In the same or another embodiment of such an object, the three-dimensional object can include four or more layers. Specifically, the three-dimensional object can include between 2 and 10,000 layers. More specifically, the three-dimensional object can include 100 to 500 layers.

These and other aspects of the subject matter are disclosed in more detail in the description of the invention given below.

DETAILED DESCRIPTION OF THE INVENTION

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims.

Disclosed herein, are advantageous processes and materials for use in additive manufacturing processes in which a thixotropic thermoset material comprising a thermoset resin and at least one rheology control agent is deposited on a surface as a plurality of beads to form one or more layers of a three-dimensional structure. The thermoset material is cured to provide a three-dimensional structure.

As discussed in greater detail below, the thermoset material includes a rheology control agent to provide a thermoset material having thixotropic properties. As a result, the thixotropic thermoset material is capable of being extruded through a nozzle to form a bead on a surface that retains its shape upon being deposited and does not flow after deposition on the surface.

The use of a thermoset resin provides advantages in comparison to the use of a molten thermoplastic material. In particular, a molten thermoplastic material, such as that used in conventional material extrusion, gains strength as the material cools. As a consequence, the resulting cured article may not have uniform strength throughout its structure. In comparison, the present invention provides a method in which the thixotropic thermoset material may be cured after one or more beads, or one or more layers have been deposited in contact with each other. Such delayed curing may allow for crosslinking between adjacent beads and adjacent layers to thereby produce a three dimensional structure having improved strength.

Definitions

As used herein the term "additive manufacturing" refers to any process of joining materials to make objects by depositing layer upon deposited layer. Each layer will have the desired dimensions and shape such that together the layers form a three-dimensional, engineered structure.

As used herein, the term "thermoset" or "thermosetting" refers to a property of a polymer precursor or polymer made from such precursor where the polymer once crosslinked is irreversibly cured such that after thermosetting has taken place, the resin cannot be melted or dissolved without some chemical decomposition taking place first. The cure may be induced by heat above the set temperature, through a chemical reaction that leads to formation of covalent bonds that were not present prior to cure. In addition to heat, some thermoset polymers may be cured via a chemical reaction in which two components chemically react to cure the polymer. Other methods of curing may include exposure to a humid environment, such as a chamber having a relative high humidity.

As used herein, the term "thermoset resin" or "thermosetting resin" refers to precursor materials that will form a thermoset polymer when induced to polymerize and crosslink as described herein. Thermoset resins are distinguishable from thermoplastic materials and resins, which are known in the art. Thermosetting resins are chemically distinct from thermoplastic resins and can be contrasted with thermoplastic polymers which are commonly produced in pellets and shaped into their final product form by melting and pressing or injection molding.

As used herein the term "thixotropic thermoset material," "thixotropic thermoset resin," or "thixotropic thermosetting resin" refers to a thermoset resin that has been formulated to have thixotropic properties by the addition of one or more rheological control agents. Thixotropic thermoset materials in accordance with embodiments of the present invention exhibit shear-thinning behavior when subjected to a shear stress, and at least partial recovery (increase) of viscosity upon removal of the shear stress. As a result, the thixotropic thermoset materials are capable of flowing when subjected to a shear stress, and exhibit no or minimal flow in the absence of the shear stress. More specifically, thixotropic thermoset materials in accordance with the present invention when under a zero shear rate have a yield strength or Bingham yield point that is greater than the force of gravity, such that the thixotropic material is static and does not flow without an external shear stress greater than the force of gravity is applied. As noted previously, the thixotropic thermoset materials exhibit a recovery or partial recovery of viscosity upon removal of the shear stress. By partial recovery it is meant that the viscosity of the material following removal of the shear stress is sufficiently increased such that a second bead of the thixotropic thermoset material deposited onto a previously deposited bead of the material will retain its shape and not flow into the previously applied bead. In other words, the thixotropic thermoset material has an initial viscosity (also referred to herein as its static viscosity) prior to the application of a shear stress, and a second viscosity that is lower than the initial viscosity when a shear stress is applied. Upon removal of the shear stress, the material exhibits at least partial recovery of the initial viscosity. Ideally, thixotropic thermoset materials in accordance with embodiments of the present invention are capable of being deposited as a bead that exhibits little to no flow, and that retains its shape following deposition on a surface.

As used herein, the terms "rheological control agent," "rheological control additive," "rheology control agent," and "rheology control additive" are used interchangeably to refer to an additive that is combined with a thermoset resin to provide a thixotropic thermoset material.

As used herein, the term "curing" refers to the chemical crosslinking within the resin and between different layers of resin. Other chemical changes may be occurring at the same time that crosslinking is occurring. The term "crosslinking" refers to the formation of covalent bonds between thermoset resin monomers, oligomers or polymers and polymers formed therefrom. Such chemical changes are distinguished from a physical change such as melting. In thermoset polymers, unlike thermoplastic polymers, the curing is considered irreversible. Curing and the term "cure" refer to "partial" or "full" curing. As used herein, the term "partial" or "partially" cure, cured or curing refers to an amount of chemical crosslinking within the resin and between different layers of resin to form covalent bonds between the resin molecules and layers. As used herein, the term "full" or "fully" cure, cured or curing refers to an amount of chemical crosslinking within the resin and between different layers of resin to form covalent bonds between the resin molecules and layers such that subjecting the resin to additional curing conditions does not provide appreciably more of the same type of covalent bonding. Accordingly, the term "fully" does not imply that all of the crosslinking moieties must be covalently bonded.

A polymer layer that is "cured" refers to a polymer layer in which at least a portion of the available reactive sites within the polymer have reacted to form crosslinks between polymer chains in the layer or with polymer chains in adjacent layers (i.e., partially or fully cured, as defined above). Accordingly, as used herein, a "cured" polymer includes those materials which are at least partially cured.

The term "structure" or "three-dimensional structure" and the like as used herein refer generally to intended or actually fabricated three-dimensional configurations, objects, or parts that are fabricated and intended to be used for a particular purpose. Such structures, etc. may, for example, be designed with the aid of a three-dimensional CAD system. The shapes are engineered, meaning that they are particular shapes designed and manufactured according to specification in the desired shape as contrasted with random shapes. The structures will be comprised of layers as described herein. In contrast, structures formed from other methods, such as molding, will not contain such layers. A "plurality" of structures refers to two or more of such structures that are substantially identical. As used herein, the term "substantially" implies that the structures are identical in all respects but are allowed to have minor topological imperfections. Additionally, the terms "three-dimensional model" and "3D model" refer to objects, parts, and the like built using layer-based additive manufacturing techniques, and are not intended to be limited to any particular use.

The terms "about" and "substantially" are used herein with respect to measurable values and ranges due to expected variations known to those skilled in the art (e.g., limitations and variabilities in measurements).

As used herein, the term "bead" refers to a continuous stream or line of resin that is deposited on a surface by at least one extrusion nozzle. The bead may be linear or non-linear, and may have a variety of cross-sections including circular, elliptical, rectilinear, trapezoidal or other shapes.

As used herein a "single layer" of resin can be any amount of material applied in any fashion prior to the addition of any new material (the next layer) proximate to a previously deposited layer of material. Typically, a single layer of material is provided proximate to a substrate or a previously deposited layer of material. A single layer may comprise a single bead of extruded resin or a plurality of beads of extruded resin that have been cured or partially cured. Preferably, curing of the layers occurs after two or more layers have been deposited so that polymer chains of adjoining layers (e.g., layers built one on top of each other) crosslink with each other, and thereby improve the strength of the resulting part in the in z-direction.

As used herein, the term "contacting" includes extruding, applying, spreading, filling dumping, dropping and the like such that the beads of the thermoset resin are in position for the processes described herein to proceed.

As used herein, the term "curing conditions" refers to conditions under which the resin cures. Types of curing conditions include thermal energy (e.g., radiative heating), humidity, and chemical reactions between multicomponent systems.

As used herein, the term "irradiation" refers to the thermal energy the resin is subjected to such that the resin is heated through radiative heating. As discussed elsewhere herein, irradiation may be achieved by a laser source, oven, or the like. The rate and amount of irradiation can vary depending on the parameters of the additive manufacturing processes and devices utilized. In one embodiment, irradiation does not include photocuring of the resin.

Thixotropic Thermoset Material

Thixotropic thermoset materials in accordance with embodiments of the present invention comprise a thermoset resin and a rheological control agent. As discussed above, the addition of the rheological control agent helps to modify the rheological properties of the thermoset resin and thereby render it thixotropic. The thixotropic thermoset material may then be dispensed from an extrusion nozzle as a bead that thereafter retains its shape until cured with minimal or no lateral flow. After deposition, the thixotropic thermoset resin may be cured using curing methods known in the art.

Thixotropic thermoset materials in accordance with embodiments of the present invention may have a thixotropic index that is greater than 5. The thixotropic index is a ratio of a material's viscosity at two shear rates. A thixotropic material's viscosity will reduce as the shear rate through agitation is increased. This index indicates the thixotropy of the inventive thixotropic thermoset material. In the present invention, the thixotropic index is the ratio of the viscosity of the resin at $0.1 \text{ sec}^{-1}$ to the viscosity of the resin at $1 \text{ sec}^{-1}$ both measured at 25° C.

In general, the only practical upper limit on the thixotropic index of the thixotropic thermoset resin is the ability of the apparatus (e.g., a pump) to cause the material to flow under shear stress. Preferably, the thixotropic index of the thixotropic thermoset material is greater than 6, and more preferably greater than 10, and even more preferably, greater than 25.

Useful thermoset resins for use in embodiments disclosed herein are any known thermoset resins that are in the form of a liquid, and are compatible with a rheological control agent to form a thixotropic thermoset resin.

Examples of suitable classes of thermoset resins may include phenolic resins, amino resins, redox curing monomeric acrylates, isocyanatoururethanes, polyisocyanates, epoxies, olefin-containing resins, and polyamidoamine-epichlorohydrin adducts. In particular, useful thermoset resin may be selected from the group consisting of thermoset phenolic resins; thermoset cyanoacrylate resins, thermoset lignin resins; thermoset tannin resins; thermoset amino resins; thermoset polyimide resins; thermoset isocyanate resins; thermoset (meth)acrylic resins; thermoset Maillard reactants, thermoset vinylic resins; thermoset styrenic resins; thermoset polyester resins; thermoset melamine resins; thermoset vinyl ester resins; thermoset maleimide resins, such as bismaleimide resins; thermoset cyanate ester resins; epoxy resins; polyamidoamine resins; and mixtures thereof.

One useful phenolic, thermosetting resin is REST-BOND® 6773 sold by Georgia-Pacific Chemicals. A phenolic, curable precursor resin can range in mole ratio of formaldehyde to phenol from 2:1 to 2.95:1. A more preferred range is from 2:1 to 2.65:1. The pH of a phenolic, curable precursor resin can range from 7.1 to 13.9. A more preferred range is from 8.5 to 12.9. A phenolic, curable precursor resin at 50 wt % solids in an aqueous medium can range in viscosity from 60 to 60,000 cps at room temperature. A more preferred range for the phenolic, curable precursor resin at 50 wt % solids in an aqueous medium is from 100 cps to 2000 cps at room temperature.

Another category of thermoset resins include polyamidoamines and polyamidoamine-epihalohydrin adducts. An example of a suitable polyamidoamine-epihalohydrin adduct resin is AMRES® 1110-E available from Georgia-Pacific Chemicals. Examples of polyamidoamines and polyamidoamine-epihalohydrin adduct resins that may be useful in some embodiments of the present invention are described U.S. Pat. Nos. 2,926,154, 3,086,961, 3,700,623, 3,772,076, 4,233,417, 4,298,639, 4,298,715, 4,341,887, 4,853,431, 5,019,606, 5,510,004, 5,644,021, 6,429,267, 7,189,307, and 8,785,593.

One example of an amino resin is a urea-formaldehyde resin sold under the trade name GP® 600D16 by Georgia-Pacific Chemicals.

In one embodiment, the thermoset resin may be non-aqueous. Examples of non-aqueous thermoset resins include acrylates resins, such as methyl methacrylate and butylacrylate, isocyanate resins, and thermoset epoxy resins.

The thermoset resin may also be selected from thermoset resins known in the art including at least one resin selected from polyimide resins; isocyanate resins; (meth)acrylic resins; phenolic resins; vinylic resins; styrenic resins; polyester resins; melamine resins; vinyl ester resins; maleimide resins; and mixtures thereof.

The resins that have been named are intended to be examples of classes without limiting the range of materials that may be used.

The resins described herein, including those known in the art, can contain a catalyst. The type of catalyst will be chosen based on the crosslinking moieties on the thermosetting resin and is well within the skill of those in this field. Non-limiting examples include the following. For example, the crosslinking of isocyanate moieties can be catalyzed with dimethylaminopyridine or dibutyl tin oxide. The crosslinking of resole phenol formaldehyde resins can be catalyzed with sodium hydroxide, potassium hydroxide or salts of ethylenediamine-sulfonic acid. The crosslinking of a methacrylate resin is initiated by a redox initiator consisting of, for example, cumene hydroperoxide and dimethylaniline.

The amount of rheology control additive that is blended with the thermoset resin generally depends on the desired cure and flow properties of the prepared thixotropic thermoset resin. In general, the amount of rheology control additive is selected to provide a thixotropic thermoset material as defined previously, and that exhibits little to no lateral flow or movement when under zero externally applied shear stress. However, when subjected to a sufficient externally applied shear stress, the thixotropic thermoset material will undergo shear thinning so that the resin will flow, and is capable of being deposited from an extrusion nozzle as a bead. As noted previously, the thixotropic thermoset material also exhibits recovery or partial recovery of its initial viscosity upon removal of the shear stress.

In one embodiment, the thixotropic thermoset resin is formulated to have a change from an initial viscosity of about 1000 cps or greater when in a static or non-shear stress state and to have a viscosity of less than 100 cps when subjected to shear stress. Preferably, the thixotropic thermoset resin recovers or at least partially recovers its static viscosity upon removal of the externally applied shear stress by being deposited as a bead in the building process. The selection of the amount of rheology control additive to include in the formulation is well within the skill of those in this field.

Examples of suitable rheology control additives may include fumed silica organoclays, such as bentonite clays, polysaccharides, cellulosic compounds, such as microcrystalline cellulose, cellulose acetate and cellulosic ether, and derivatives thereof, coal tar, carbon black, textile fibers, glass particles or fibers, aramid pulp, boron fibers, carbon fibers, mineral silicates, mica, powdered quartz, hydrated aluminum oxide, wollastonite, kaolin, silica aerogel or metal powders such as aluminum powder or iron powder. Among these, fumed silica is preferred.

Commercially available examples of fumed silica that may be used in embodiments of the present invention are HDK® T-30 available from Wacker, and AEROSIL® 200 available from Evonik Degussa.

In some embodiments, the rheology control additive may be hydrophobic. Generally, the amount of rheology control additive in the thixotropic thermoset material is from about 1 to 35 weight percent, based on the total weight of the material, and more preferably, from about 2 to 25 percent, and even more preferably, from about 4 to 25 weight percent, and most preferred from about 5 to 15 weight percent, based on the total weight of the material.

In embodiments comprising an inorganic based rheology control additive, the amount of inorganic is generally less than 50 weight percent, and more preferably less than 35 weight percent, and even more preferably less than 25 weight percent, based on the total weight of the material.

In addition to the thermoset resin and rheology control additive, the thixotropic thermoset material may also include additional additives. Examples of additives that may be used include curing enhancing agents, stabilizers, such as photostabilizers, diluents, fillers, antioxidants, viscosity modifying agents, pigments and dyes, fire-retarding agents lubricants, dispersants, impact modifiers, adhesion promoters, and combinations thereof.

These additives are commercially available from a wide variety of sources and are well known by those of skill in the art. One of skill in the art would readily identify which additives are desirable depending on the intended application and end use of the part.

For example, a wide variety of different impact modifiers may be used including cycloneopentyl, cyclo (dimethylaminoethyl) pyrophosphato zirconate, dimesyl salt, acrylonitrile/methacrylonitrile copolymer, butadiene/acrylonitrile copolymer, silicone resin, and isopropyl tridodecylbenzenesulfonyl titanate.

As disclosed elsewhere herein, the use of curable thermoset resins has many advantages. An exceptionally useful aspect of embodiments described herein is the ability to use a thermoset resin in an additive manufacturing process to form a 3D object of almost any shape or geometry comprised or consisting essentially of the cured thermoset resin.

In an embodiment, the subject matter described herein is directed to a method of preparing a three-dimensional structure, the method comprising:
  i. extruding a bead of a thixotropic thermoset resin onto a build platform;
  ii. subjecting the bead of the thixotropic thermoset resin to curing conditions, wherein the thixotropic thermoset resin is at least partially cured to form a cured first polymer layer;
  iii. extruding a second layer of the thixotropic thermoset resin with the cured first polymer layer; and
  iv. subjecting the second layer of thixotropic thermoset resin to curing conditions, wherein the second layer of thixotropic thermoset resin is at least partially cured to form a cured second polymer layer, and wherein the three-dimensional structure is prepared.

In some embodiments, the cured first polymer layer may be cross-linked with the cured second polymer layer.

As will be discussed in detail below, the method can further comprised infusing any pores in the structure with an organic or inorganic penetrant material.

In further embodiments, the subject matter described herein is directed to a method of preparing a three-dimensional structure, the method comprising:
  i. extruding bead of a thixotropic thermoset resin with a build platform;
  ii. extruding one or more additional successive beads of the thixotropic thermoset resin in contact with the first bead of thixotropic thermoset resin;
  iii. subjecting the thus extruded beads of the thixotropic thermoset resin to curing conditions to form a plurality of cured polymer layers, wherein the cured polymer layers are cross-linked to adjacent layers, and wherein at least one of the layers comprises a thermoset resin; wherein the three-dimensional structure is prepared.

Thus the structures prepared will comprise a layer of cured thermoset resin in an engineered pattern having desired dimensions and shape.

The steps may be repeated successively as many times as desired to produce an engineered, three-dimensional structure in an additive manufacturing technique. As described herein therefore, the process can include independently selecting any type of thixotropic thermoset resin in any successive step to prepare a structure having the desired composition.

In certain embodiments, subjecting the thixotropic thermoset resin to curing conditions may include subjecting the thermoset resin to thermal radiation including exposure to actinic radiation, visible or invisible light, UV-radiation, IR-radiation, electron beam radiation, X-ray radiation or laser radiation in order to heat and cure the resin. In one embodiment, subjecting the thixotropic thermoset resin to curing conditions may comprise exposing the structure to thermal energy from heating elements, as in an oven. In other embodiments, the step of subjecting the thixotropic thermoset resin to curing conditions may comprise exposing the structure to a high relative humidity. For example, certain thermoset resins having isocyanate moieties may undergo curing by being exposed to moisture. In other embodiments, the subjecting the resin to curing conditions may comprise mixing of two chemical components to effect a chemical reaction that results in curing of the resin. For example, the reaction of an oxidant such as cumene hydroperoxide with a reductant such as dimethyl aniline to form a redox initiator to effect the cure of methyl methacrylate.

In practicing the disclosed methods, a first layer of thixotropic thermoset resin can be the same type of resin as the second layer of thermoset resin. As a non-limiting example, both layers can be the same species of thermoset phenolic resin. Alternatively, the first layer of thixotropic thermoset resin can be a different type of resin than the second layer of thermoset resin. As a non-limiting example, one layer can be a thermoset phenolic resin and the second layer can be a thermoset amino resin; or one layer can be a phenolic resin species and the other layer a different species of phenolic resin. Accordingly, successive layers in the structure can be composed of the same or different materials.

In embodiments, the present subject matter is directed to a structure comprising, a cured thermoset resin having an engineered three-dimensional shape. The structure will comprise one or more layers of a cured thermoset resin. Accordingly, in embodiments, the structure can contain from 2 to an unlimited number of engineered layers; from 2 to about 10,000 layers; from 2 to about 5,000 layers; from 2 to about 1,000 layers; from 2 to about 500 layers; from 2 to about 250 layers; from 2 to about 100 layers; from 10 to about 500 layers; from 50 to about 500 layers; from 100 to about 500 layers; or from 250 to about 500 layers. Each layer may be of the same or different type of resin. Each layer may be the same or different dimensions. There is almost no limit to the shapes that can be prepared by additive manufacturing. The shapes will be designed and engineered to a specification. The methods described herein can prepare the structures according to the specification. In embodiments, the structure is an engineered three-dimensional shape designed using computer-aided design. Almost unlimited substantially identical copies of the structures can be prepared by the methods. In aspects of this embodiment, the present subject matter is directed to a plurality of monodisperse three-dimensional structures comprising, two or more discrete structures, each comprising or consisting essentially of a cured thermoset resin having an engineered three-dimensional shape, wherein each structure of the plurality is substantially identical. In this embodiment, the material distinction is that the structure is fabricated using essentially only the thixotropic thermoset resin.

However, the structures may contain other components. In another aspect, any pores in the structure formed by curing the thixotropic thermoset resin may be infused with organic material or inorganic material. Accordingly, the method of preparing a structure as described above can further comprise contacting the formed structure with an organic or inorganic material to infuse any pores in the structure with the organic or inorganic material. In this embodiment, the step of contacting can include immersing, soaking and the like for an amount of time sufficient to infuse. The infusion step may be performed under increased pressure to facilitate infusion.

Those of ordinary skill in the art would immediately recognize the materials that are compatible with each other for infusion. In other words, the penetrant material should be chosen to be compatible with the cured material of the structure.

One organic material that may be used to infuse the structure is an epoxy resin such as Epon® 828. Other resins that may be used include polymeric MDI, polyurethanes, and acrylic resins.

An inorganic material that can be used to infuse the structure is molten Belmont alloy. Other molten metals that may be considered are copper, bronze, silver, tin, pewter, lead and aluminum.

Additionally, radiation energy may be used to carbonize the structure after the thixotropic thermoset resin has cured. The carbonization step may be done as part of the curing process or may be done as a separate step with the same laser or a second laser. The carbonization step may be done in an ambient atmosphere or done in either an oxygen-rich atmosphere or an inert atmosphere.

The structure from such a process may range in carbon content from about 65 wt % carbon to about 99.5 wt % carbon; from about 70 wt % carbon to about 95 wt % carbon; from about 75 wt % carbon to about 90 wt % carbon; or from about 80 wt % carbon to about 85 wt % carbon. Furthermore, carbonized materials may be dosed with one or more different materials such as metals to impart functionalities such as embedded catalysts on porous carbon. This type of multi-material structure can be realized by 1) placing metal powder (or other material powder) selectively at all calculated interception points for the currently formed carbonized layer, and 2) sintering or melting the powder to infuse it onto carbon layer. More metals or other materials can be added by repeating above procedure with a different powder.

Additive Manufacturing Processes and Devices

Additive manufacturing is defined by the American Society for Testing and Materials (ASTM) as the "process of joining materials to make objects from 3D model data, usually deposit layer upon deposit layer, as opposed to subtractive manufacturing methodologies, such as traditional machining and casting." As referred herein as "additive manufacturing," there are a number of processes for creating a digital model and producing a three-dimensional solid object of virtually any shape from that model. These processes are colloquially named 3D printing, rapid prototyping, additive manufacturing, and the like.

As disclosed herein, the usefulness of additive manufacturing technology to provide low cost product assembly and the building of any number of products with engineered, complex shapes/geometries, complex material compositions and designed property gradients has been expanded to thixotropic thermoset resins as the material for the build for use in material extrusion processes in particular.

In an additive-manufacturing process, a model, such as a design model, of the component may be defined in any suitable manner. For example, the model may be designed with computer aided design (CAD) software. The model may include 3D numeric coordinates of the entire configuration of the component including both external and internal surfaces. The model may include a number of successive 2D cross-sectional slices that together form the 3D component.

There is typically a relatively high cost of operation and expertise is required to operate 3D printers. 3D design files can be created using CAD software, such as SolidWorks™, to generate a digital representation of a 3D object. The STL (Standard Tessellation Language) file format is a commonly used format for storing such CAD files. This CAD file, in other words the digital representation of the 3D object, is subsequently converted into a series of contiguous 2D cross sections, representing sequential cross-sectional slices of the 3D object. These 2D cross sections are commonly referred to as 2D contour data. The 2D contour data can be directly input into a 3D printer in order for the printer to print the 3D object. Conversion of a 3D design file into 2D cross-sectional data is often carried out by dedicated software.

As such, additive manufacturing systems are used to print or otherwise build three-dimensional 3D parts from digital representations of the 3D parts (e.g., AMF and STL format files) using one or more additive manufacturing techniques. In the present invention, the additive manufacturing techniques described herein are directed to an extrusion-based process in which a thixotropic thermoset resin is deposited and cured in successive layers to form a 3D part.

At an initial stage, the digital representation of the 3D part is sliced into multiple horizontal layers. For each sliced layer, a tool path is then generated, which provides instructions for the additive manufacturing system to print the given layer.

A three-dimensional structure of the present invention may be built using, for example, a three-dimensional printing system similar to embodiments described in U.S. Pat. Nos. 5,121,329, and 6,658,314.

An exemplary three-dimensional extrusion system may generally include one or more extrusion nozzles, and at least dispenser in which the thixotropic thermoset resin is disposed. The system will may also include a pump, piston or similar device to apply external shear stress to the thixotropic thermoset resin and thereby cause the resin to flow from the dispenser to an associated extrusion nozzle. The thixotropic thermosetting resin may be supplied to the extrusion nozzle as a single component system, or alternatively, may include two or more components that are only mixed prior to extrusion. A static mixing tube is one device that is designed to intimately mix two components immediately prior to extrusion.

In one embodiment, the extrusion system may include at least two extrusion nozzles. For example, a first extrusion nozzle may be connected to a first dispenser that is used to dispense a first thixotropic thermoset resin, and a second extrusion nozzle may be connected to a second dispenser that is used to dispense a second thixotropic thermoset resin.

The built platform may comprise a work table, substrate or the like, which may be a releasable substrate, on which the three-dimensional article is to be formed.

The three-dimensional extrusion system further includes a controller, CAD system, optional curing device, and optionally a positioning apparatus. The controller is coupled to the CAD system, curing unit, positioning apparatus, extrusion nozzle(s) and dispensers containing the thixotropic thermoset resin. Control may be effected by other units than, such as one or more separate units. The three-dimensional structure is built in layers, the depth of each layer typically being controllable by selectively adjusting the output from each extrusion nozzle.

Depending on the nature of the thermoset resin and the desired curing mechanism, the curing device may be integral to the three-dimensional extrusion system, or may comprise a separate and stand-alone device. For example, the curing device may comprise an energy source for delivering thermal energy (e.g., radiant heat) to the deposited resin whereby curing of the thermoset resin takes place, heating element, oven, high relative humidity chamber, or the like.

In one embodiment, the extrusion nozzle may be heated to initiate curing of the thixotropic thermoset resin as it is deposited onto the build platform.

The systems employed in the embodiments described herein are generally used for manufacturing three-dimensional structures from a curable thermoset resin and for manufacturing an engineered three-dimensional structure comprised of the cured thermoset resin. This manufacturing can be employed for rapid prototyping. A device comprising a source of curing energy (such as a $CO_2$ laser, IR lamp, oven, etc.) can provide the necessary curing conditions to effect curing of the resin.

A three-dimensional structure is formed through consecutive deposition and immediate or eventual crosslinking of consecutively formed cross sections of layers, successively laid down by the extrusion nozzle. Systems for depositing a layer containing or more beads of the thixotropic thermoset resin may comprise any known means for laying out a bead of flowable resin material.

The devices utilize a computing system which implements design tools and/or topology optimization according to desired design aspects. The system includes a memory. The memory may store data. The memory may store executable instructions used to implement the topology optimization according to the desired design. The executable instructions may be stored or organized in any manner and at any level of abstraction, such as in connection with one or more processes, routines, procedures, methods, etc.

The instructions stored in the memory may be executed by one or more processors. The processor may be coupled to one or more input/output (I/O) devices. In some embodiments, the I/O device(s) may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) may be configured to provide an interface to allow a user to interact with the system in the generation of a specification according to the desired build.

The specification is transferred to an additive manufacturing device which performs the additive manufacturing techniques according to the specification in order to create the 3D structure. While not required in all aspects, the additive manufacturing device can include processors that interpret the specification, and control other elements which apply the materials using robots, nozzles, lasers or the like to add the materials as layers or coatings to produce the 3D structure.

The following discussion is provided as an example of how a three-dimensional structure can be built in accordance with embodiments of the present invention. It should be recognized that other systems and processes can be used to build three dimensional structures using the thixotropic thermoset resins described herein.

In an initial step, the thixotropic thermoset resin is subjected to sufficient external sheer stress to cause the resin to flow from a dispenser to an associated nozzle. The resin is then deposited as a bead onto the build platform. In one embodiment, the nozzle may make multiple passes, with each pass taking place in a controlled pattern as dictated by the computer software to form a single layer.

Curing of the thixotropic thermoset resin may be initiated while the resin is being deposited, or initiated after one or more of the deposition of a bead, multiple beads, a single layer, multiple layers, or combination thereof is completed. In some embodiments, the thixotropic thermoset resin may be subjected to curing after each layer or after two or more successive layers have been deposited.

Generally, the computer and related software programs determine when the extrusion nozzle is on and off based on the digital computer model. The machine controller controls the operation of the extrusion nozzle along the "X," "Y," and "Z" axes via a plurality of drive motors. Each of these motors may be operating separately, or one or more of them may be operating simultaneously, depending upon the shape of the structure to be formed. Circular patterns for each layer can be generated by controlled movement along the "X" and "Y" axes of the build platform.

The extrusion nozzle may be initially positioned a predetermined height above the build platform to form the first layer of the three dimensional structure. The height of each subsequent layer is then closely controlled. Typically, thinner layers provide result in the surface of the structure having an overall smoother surface. Thicker layers generally increase the speed at which the structure is built. Layers as thin as 0.0001 inches may be formed. The layers can be formed horizontally, vertically, or in any 360° orientation to the horizontal. Depositing of the resin may take place along any of the three axes. The dispensing of the resin may take place along only the "X"-"Y" plane, until it is advantageous to deposit in the "X" "Z" plane or the "Z" "Y" plane. Normally, the extrusion nozzle will be mounted along the "Z" axis generally perpendicular to the build platform, and thus perpendicular to the "X"-"Y" plane of build platform.

When forming and building up multiple layers, one or more beads of the thixotropic thermoset resin are deposited to form a first layer. The first layer may take any shape dictated by the computer program. The first layer (or multiple layers) may then be subjected to an energy source to initiate curing of the resin. A second and each subsequent layer may take slightly different shapes, as dictated by the particular cross section for each layer from the computer program and layering software. In the pattern situation for each layer wherein each layer is formed only in a horizontal "X"-"Y" plane. A motor supporting the extrusion nozzle may be selectively actuated after each layer is formed to move the nozzle or build platform incrementally along the "Z" axis a closely controlled, predetermined distance to control the gap between layers and thus the thickness of each layer.

After the extrusion nozzle or build platform is thus moved, the next layer is dispensed and formed along a controlled path. In some instances, the extrusion nozzle may be moving in a direction along the "Z" axis as the layer is formed, such as when forming a spiral pattern, and the software program will control the location of the extrusion nozzle or build platform at the end of each layer. Thus, when at the start position for the next layer, the extrusion nozzle or build platform may have already been moved a distance along the "Z" axis above the corresponding point on the previously-formed layer. In such a situation, the extrusion nozzle or build platform may not have to be moved at all at the commencement of the next layer, or it may be moved incrementally a very small distance to form the desired gap between layers, and thus the predetermined layer thickness.

The multiple layers may be of uniform thickness, or the layers may vary in thickness, as necessary and appropriate for the forming of a particular structure. Also, the layers may each vary in thickness across the height of each layer.

Additive manufacturing systems build the solid part one layer at a time. Typical layer thicknesses range from about 0.001-10.00 mm. However, depending on the build design, the layer may be thicker or thinner as practicable. The thickness can be adjusted depending on the process parameters, including the average height of the bead in the layer, the total number of layers that make up the structure, and the speed in which the structure is being built.

The device may operate generally according to a method comprising the following steps: (i) depositing out one or more beads of the thixotropic thermoset resin on the build platform to form a layer; (ii) curing the layer by subjecting the deposited layer of thixotropic thermoset resin to radiation (e.g., thermal energy), (iii) laying out one or more successive beads to form a successive layer on top of the previous layer; (iv) curing the successive layer to form the next cross-sectional layer; (v) repeating steps (iii) and (iv) until the three-dimensional structure is built. As noted it previously, in some embodiments, it be desirable to first deposit multiple successive layers prior to initiating a step of curing the thixotropic thermoset resin.

Energy Sources

Curing of the thermoset resins may be accomplished in a variety of different ways depending on the thermoset resin. In one embodiment, curing is accomplished by subjecting the resin to irradiation that thermally heats the resin to effect curing. In preferred embodiment, thermal energy is used for curing. Curing temperatures may typically range from 25° C. to 125° C.

The electromagnetic radiation may include actinic radiation, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be readily determined.

The following examples are offered by way of illustration and not by way of limitation.

EXAMPLES

In the following examples, various thixotropic thermoset materials were prepared and evaluated based on their thixotropic properties and potential usefulness in additive manufacturing processes.

The materials used in the thixotropic thermoset materials are identified below. All percentages are weight percents unless indicated otherwise. All physical property and compositional values are approximate unless indicated otherwise.

"THR-1", refers to a polyamidoamine-epichlorohydrin adduct resin available under the trademark AMRES® 1110-E from Georgia-Pacific Chemicals.

"THR-2", refers to phenol-formaldehyde resin available under the trademark RESI-BOND® 6773 from Georgia-Pacific Chemicals.

"ITU": refers to an isocyanate-terminated urethane available under the product name GORILLA® Glue, available from Gorilla Glue, Inc. The ITU had a molecular weight of about 4200 performed by gel permeation chromatography using a Waters HSPGel RT column and detected by refractive index.

"TEAOH" refers to a triethanolamine available from Sigma-Aldrich sold as Triethanolamine, reagent grade.

"MMA": refers to a methyl methacrylate containing ≤30 ppm MEHQ, which is available from Sigma-Aldrich.

"BAA": refers to a benzaldehyde-aniline adduct available under the product name VANAX® 808, from R.T. Vanderbilt Co.

"EPOXY" refers to a liquid epoxy resin that is a reaction product of epichlorohydrin and bisphenol-A, and is available under the product name EPO-KEM® 1000, from Kemrock Industries and Exports Ltd.

"IPD": refers to an isophone diamine available as 5-Amino-1,3,3-trimethylcyclohexanemethylamine, mixture of cis and trans from Sigma-Aldrich.

"CSM": refers to a solution of chlorosulphonated polyethylene available under the product name TOSOH CSM® from Tosoh Corp.

"RH-1": refers to fumed silica rheology modifier available under the product name HDK® T-30 from Wacker.

"RH-2": refers to fumed silica rheology modifier available under the product name HDK® H-18 from Wacker.

"RH-3": refers to fumed silica rheology modifier available under the product name HDK® N-20 from Wacker.

"RH-4": refers to fumed silica rheology modifier available under the product name HDK® H-13L from Wacker.

"GG": refers to a guar gum rheology modifier available from Fischer Scientific.

"KC": refers to a kaolin clay rheology modifier available from Sigma-Aldrich.

Example 1

Thixotropic Polyamidoamine-Epichlorohydrin Adduct Resin Formulation 185.5 grams of an aqueous solution of a polyamidoamine-epichlorohydrin adduct (THR-1) was weighed into a cup. The pH of the aqueous THR-1 resin was adjusted to 6.38 by adding 50 weight percent aqueous NaOH dropwise. After the pH was adjusted, 9.6 grams of RH-1 (a fumed silica from Wacker) in 1 gram aliquots was added as a rheology control agent to the THR-1 resin. The formulation was stirred by hand at room temperature after each aliquot until the RH-1 was thoroughly wetted by the aqueous resin.

A cylindrical sample of this thixotropic material with a diameter of approximately 1 cm was placed on a horizontal wooden tongue depressor. When the tongue depressor was rotated to the vertical position, the thixotropic material was not visually observed to move for five minutes at room temperature.

Example 2

Thixotropic Phenolic Resin Formulation 79.5 grams of a thixotropic resin of THR-2 (a phenol-formaldehyde) was weighed into a cup. The pH of this aqueous resin was 12.7 and this was not adjusted. 7.0 grams of RH-1 was added in 3.5 gram increments. The formulation was stirred by hand at room temperature after each increment until the RH-1 was thoroughly wetted by the aqueous resin.

A cylindrical sample of this thixotropic formulation with a diameter of approximately 1 cm was placed on a horizontal wooden tongue depressor. When the tongue depressor was rotated to the vertical position, the thixotropic material was not visually observed to move for five minutes at room temperature.

Example 3

Part Made by Material Extrusion of Thixotropic Polyamidoamine-Epichlorohydrin Adduct Resin Formulation Combined with the Material Extrusion of a Thixotropic Phenolic Resin The formulation of thixotropic polyamidoamine-epichlorohydrin adduct (tPAE) from Example 1 was loaded into a disposable, 10 ml syringe. The formulation of thixotropic phenolic (tPF) resin from Example 2 was loaded into a second, disposable, 10 ml syringe. A bead of tPAE was extruded from the nozzle of the syringe onto a borosilicate microscope slide. The bead was about 1 mm in diameter and 2 inches long. A second bead of tPF was extruded onto the bead of tPAE immediately after the first bead was applied. This second bead had the same dimensions as the first bead. A third bead was applied to the second bead immediately after the second bead was applied. This third bead was the tPAE formulation and had the same dimensions as the first and second bead. A fourth bead was applied to the third bead immediately after the third bead was applied. This fourth bead was the tPF formulation and had the same dimensions as the first, second and third bead.

After the fourth bead was applied, the microscope slide was placed in a forced air oven for 15 minutes at 105° C. The microscope slide was removed from the oven and allowed to cool to room temperature. After curing in the oven, the part was rigid and clearly showed four distinct layers of extruded material. The cured and cooled part exhibited was not visually changed in any dimension from the time it was extruded on the microscope slide.

Example 4

Thixotropic Thermoset Isocyanate Resin Formulation 69.1 grams of ITU (an isocyanate-terminated urethane resin) was weighed into a paper cup. To this aliquot of isocyanate-terminated urethane resin was added 5.23 grams of RH-1. The formulation was then stirred by hand at room temperature until the RH-1 was thoroughly wetted by the isocyanate-terminated urethane resin. A cylindrical sample of this thixotropic material with a diameter of approximately 1 cm was placed on a horizontal wooden tongue depressor. When the tongue depressor was rotated to the vertical position, the thixotropic material was not visually observed to move for five minutes at room temperature.

Example 5

Part Made by Material Extrusion of Thixotropic Isocyanate Resin Formulation

The thixotropic isocyanate resin formulation from Example 4 was placed in a 50 ml disposable syringe. A bead of the thixotropic resin with a diameter of approximately 5 mm was dispensed from the syringe onto a build platform of aluminum foil. The first bead that was dispensed was approximately 4 cm long. As soon as the first bead was dispensed on the build platform, a second bead was immediately laid on top of the first bead. This part was allowed to cure at room temperature for sixteen hours under ambient conditions. The cured part was not visually changed in any dimension from the time it was extruded on the build platform.

Example 6

Thixotropic, Two-Part Isocyanate-Terminated Urethane Resin Formulation

In Example 6, a two-part (Part A and Part B) thixotropic thermoset material was formulated and evaluated. Part A comprised 29.48 grams of ITU prepared from methylene diphenyl diisocyanate and polypropylene oxide. To this was added 1.45 grams of RH-1 as a rheology modifier. The resulting mixture was mixed for 60 seconds with a hand-held homogenizer.

Part B of the two part formulation was prepared by mixing 11.03 grams of TEAOH with 0.55 grams of RH-1. The resulting mixture was mixed for 60 seconds with a hand-held homogenizer. Then 3.60 grams of part A was mixed with 1.20 grams of part B in a syringe with the hand-held homogenizer.

Example 7

Part Made by Material Extrusion of a Two-Part, Thixotropic Isocyanate-Terminated Urethane Resin Formulation Part A and part B were made as described in Example 6 above. The 4.81 grams of part A was combined with 0.60 grams of part B in a syringe and mixed as described in Example 6. Then the thixotropic resin material (parts A and B combined) was extruded from the tip of the syringe to form a bead that was 1 mm in diameter and 2 cm long on a glass microscope slide. A second, third and fourth bead were immediately extruded on the preceding bead as soon as the preceding bead had been laid down. The resulting structure of four beads remained upright and no change in the dimensions of the beads was observed.

Example 8

Thixotropic Methyl Methacrylate Resin Formulation

A solution of 82.5 grams of methyl methacrylate (MMA) and 9.1 grams of a benzaldehyde-aniline adduct (BAA) was made. 1.5 ml of cumene hydroperoxide was added to the solution. Then, 7.5 grams of RH-2 was added in small aliquots with sufficient agitation to wet out the fumed silica after each addition. After the last addition, agitation was continued until the mixture was uniform by inspection. This mixture was Part A.

Part B was then prepared by forming a solution of CSM (a chlorosulphonated polyethylene) and methyl methacrylate. 46.6 grams of a solution that was 40 weight percent CSM in methyl methacrylate was combined with 46.5 grams of MMA. Then 6.6 grams of RH-2 was added to this solution following the above described procedure. This second solution was Part B.

Both Part A and Part B were allowed to stand at room temperature without agitation for 24 hours.

Example 9

Part Made by Material Extrusion of a Two-Part Thixotropic Methyl Methacrylate Formulation 10 grams of Part B from Example 8 was placed in the large side of a 2:1 two component polypropylene application cartridge and 5 grams of Part A from example 8 was placed in the small side of the same cartridge. The two components were mixed through a static mixer (sold by Nordson EFD) that was 5.9 inches long, contained 20 mixing elements, and had a tip diameter of 1 mm. The exudate from the static mixer was applied to the supporting surface in a bead 1 mm in diameter. After 1 minute, a second bead was placed directly on the first bead. This process was repeated until 4 beads were extruded on top of each other. After 90 minutes at room temperature and ambient atmosphere, the part was sufficiently cured to be handled and removed from the supporting surface. The final thickness of the four layer construction was about 3.9 mm.

Comparative Example 1

Part Made by Material Extrusion of a Two-Part Methyl Methacrylate Formulation that Contained No Rheology Control Agent Part A solution consisting of 20 grams of MMA and 2.2 grams of BAA without any rheology control agent fumed silica was made as described in example 8. Part B solution consisting of 8 grams of the 40 weight percent CSM solution, 8 grams of MMA, and 240 µl of cumene hydroperoxide without any fumed silica was made as described in example 8. These two parts of the resin system were used to fill a cartridge and extruded through a static mixer as described in example 9. Four beads of this two-part formulation were extruded on top of each other as described in example 9. The final thickness of the four layer construction was about 0.9 mm. This measured thickness demonstrated that the beads flowed without shear stress being applied thereby resulting in a thickness of the combined four layers of beads being less than the tip of the static mixer.

Example 10

Thixotropic Two-Part Epoxy Resin Formulation 71 grams of an epoxy resin (EPOXY) was combined with 2.1 grams of RH-2 in a plastic bottle. Four stainless steel balls were placed in the bottle and the solution was rolled at 16 rpm until the RH-2 was uniformly dispersed. Isophorone diamine (IPD) was used to make Part B of this two-part resin formulation. In a second plastic bottle, 100 grams of IPD was combined with 12 grams of RH-2. Four stainless steel balls were placed in this second bottle and were rolled at 16 rpm until the RH-2 was uniformly dispersed.

Example 11

Part Made by Material Extrusion of a Two-Part Thixotropic Epoxy Resin Formulation 10 grams of Part A from example 10 was placed in the large side of a 2:1 two component polypropylene application cartridge and 5 grams of Part B from example 10 was placed in the small side of the same cartridge. The two components were mixed through a static mixer that was 5.9 inches long and contained 20 mixing elements as described in example 9. The exudate from the static mixer was applied to the supporting surface in a bead 1 mm in diameter. A second, third and fourth bead were immediately extruded on the preceding bead as soon as the preceding bead had been laid down. The structure of four beads remained upright and no change in the dimensions of the beads was observed.

Examples 1 through 11 show that a thixotropic, thermosetting resin formulation can be extruded to form a structure of defined shape. The comparative example shows that, if the formulation is not thixotropic, then that formulation cannot be extruded to form a structure of defined shape.

Examples 12-26

In the following examples, various thixotropic thermoset materials were prepared and evaluated for suitability for use in additive manufacturing processes. Four different resin systems were formulated with different rheology control agents using methods similar to the procedure described in Example 1.

The different combinations of resin system and rheology control agents are shown in Table 1 below.

The only resin systems that required pH adjustment were the polyamidoamine-epichlorohydrin adduct as was done in Example 1 (Examples 25 and 26). The remaining resin systems were used as supplied.

The resin systems of Examples 12 to 26 were based on the resin components used in the above examples 1-11. More specifically, the methyl methacrylate resin system (MMA of Examples 12-14) was the same resin components as described in Example 8; the NCO-terminated urethane (NCO-TU of Examples 15-21) was the same resin components as described in Example 6; the epoxy resin system (Epoxy of Examples 22-24) was based on the same resin components as described in Example 10, and the polyamidoamine-epichlorohydrin adduct system (PEA of Examples 25 and 26) was based on the same resin components as described in Example 1.

Different rheology control agents were mixed with the various resin systems at different weight percentages to evaluate the effect on the thixotropic properties of the thixotropic thermoset materials. Each resin system was extruded at room temperature from a 25 ml syringe with a 1 mm orifice. Four successive layers were applied such that the $2^{nd}$, $3^{rd}$ and $4^{th}$ layers rested on each preceding layer. A formulation was judged to pass when four layers could be applied successively without flow of the first applied bead.

In addition, the thixotropic index of each of the resin systems was determined in which the rheometry was of each resin system was evaluated with an AR-2000ex Rheometer sold by TA Instruments. As noted previously, thixotropic index is defined as the ratio of the viscosity at 0.1 $sec^{-1}$ to the viscosity at 1 $sec^{-1}$ measured at 25° C.

TABLE 1

Evaluation of Thixotropic Properties of Resin Systems

| Example No. | Resin System | Rheology Control Agent | Amount of Rheology Control Agent (wt. %) | Thixotropic Index | Four Layers applied without flow (pass/fail) |
|---|---|---|---|---|---|
| 12 | MMA[1] | RH-3 | 5.0 | 11.4 | pass |
| 13 | MMA[1] | RH-2 | 5.0 | 25.0 | pass |
| 14 | MMA[1] | RH-4 | 5.0 | 5.0 | fail |
| 15 | NCO-TU[2] | RH-3 | 2.0 | 1.1 | fail |
| 16 | NCO-TU[2] | RH-3 | 2.0 | 1.8 | fail |
| 17 | NCO-TU[2] | RH-3 | 2.0 | 1.6 | fail |
| 18 | NCO-TU[2] | RH-3 | 5.0 | 0.8 | fail |
| 19 | NCO-TU[2] | RH-3 | 5.0 | 3.3 | fail |
| 20 | NCO-TU[2] | RH-3 | 5.0 | 2.5 | fail |
| 21 | NCO-TU[2] | RH-3 | 4.5 | 10.2 | pass |
| 22 | Epoxy[3] | RH-3 | 5.0 | 1.1 | fail |
| 23 | Epoxy[3] | RH-3 | 5.0 | 6.0 | pass |
| 24 | Epoxy[3] | RH-3 | 5.0 | 1.8 | fail |
| 25 | PEA[4] | GG | 5.0 | 10.4 | pass |
| 26 | PEA[4] | KC | 5.0 | 1.5 | fail |

[1]Methyl methacrylate(resin material of Example 8).
[2]NCO-terminated urethane (resin material of Example 6).
[3]Two-part epoxy resin system of Example 6.
[4]Polyamidoamine-epichlorohydrin adduct resin system of Example 1.

From Table 1 above, it can be seen that the thixotropic resin systems having a thixotropic index of 5 or less failed, and were therefore determined to be unsuitable for use in additive manufacturing processes of the present invention. The thixotropic materials having a thixotropic index above 5, and in particular, at least 6 or above, all passed the evaluation.

That which is claimed:

1. A method of preparing a three-dimensional structure, the method comprising:
   i. extruding a first bead of a first thixotropic thermoset material onto a support, wherein the first thixotropic thermoset material comprises a first thermoset resin and a first rheology control agent,
   ii. subjecting the first bead to curing conditions such that the thixotropic thermoset material is at least partially cured to form a cured first polymer layer,
   iii. extruding a second bead of a second thixotropic thermoset material in contact with the cured first polymer layer, wherein the second thixotropic thermoset material comprises a second thermoset resin and a second rheology control agent, and
   iv. subjecting the second bead of thixotropic thermoset material to curing conditions, wherein the second bead of thixotropic thermoset material is at least partially cured to form a cured second polymer layer, and wherein the there-dimensional structure is prepared,
   v. wherein the first and/or second thixotropic material has a thixotropic index that is greater than 5.

2. The method of claim 1, wherein the first and/or second thermoset resin is selected from the group consisting of phenolic resins; lignin resins; tannin resins; amino resins; polyimide resins; isocyanate resins; (meth)acrylate resins; vinylic resins; styrenic resins; polyester resins; melamine resins; vinyl ester resins; maleimide resins; epoxy resins; polyamidoatnine resins; and mixtures thereof.

3. The method of claim 1, wherein the first and/or second thermoset resin is selected from the group consisting of phenolic resins, amino resins, epoxy resins, isocyanate resins, and acrylate resins.

4. The method of claim 1, wherein the first cured polymer layer is cross-linked with the second cured polymer layer.

5. The method of claim 1, wherein the first and/or second thixotropic thermoset material is capable of flowing when subjected to an external shear stress and at zero shear rate having a yield strength or yield point such that the first and/or second thixotropic thermoset material does not flow.

6. The method of claim 1, wherein the steps of subjecting the first or second beads to curing conditions comprise irradiating the first or second bead with thermal energy.

7. The method of claim 1, wherein the steps of subjecting the first or second bead to curing conditions comprise subjecting the first or second bead to visible or invisible light, UV-radiation, IR-radiation, electron beam radiation, X-ray radiation or laser radiation.

8. The method of claim 1, wherein the first and/or second rheology control agent comprises fumed silica, organoclays, polysaccharides, cellulose and derivatives thereof.

9. The method of claim 1, wherein the steps of extruding a first or second bead of the first or second thixotropic thermoset material comprise subjecting the first or second thixotropic thermoset material to an external shear stress to cause the first or second thixotropic thermoset material to be extruded through an extrusion nozzle.

10. The method of claim 1, wherein the first thixotropic thermoset material has the same composition as the second thixotropic thermoset material.

11. The method of claim 1, wherein the first and/or second thixotropic thermoset material is extruded through a heated nozzle that initiates curing of the first and/or second thixotropic thermoset material.

12. A method of preparing a three-dimensional structure, the method comprising:
   i. extruding a first bead of a first thixotropic thermoset material onto a support, wherein the first thixotropic thermoset material comprises a first thermoset resin and a first rheology control agent, and wherein the first thixotropic thermoset material has a thixotropic index that is greater than 5;
   ii. extruding a second bead of a second thixotropic thermoset material, wherein the second bead is in contact with the first bead, wherein the second thixotropic thermoset material comprises a second thermoset resin and a second theology control agent, and wherein the second thixotropic thermoset material has a thixotropic index that is greater than 5; and iii. subjecting the first and second beads to curing conditions to form cured first and second polymer layers, respectively, wherein the cured first polymer layer is cross-linked with the cured second polymer layer, and wherein the three-dimensional structure is prepared.

13. The method of claim 12, further comprising successively repeating steps i. and ii, prior to step iii to form the three-dimensional structure comprising a plurality of cured polymer layers, wherein adjacent cured polymer layers are cross-linked with each other.

14. The method of claim 12, wherein the step of subjecting the first and second beads to curing conditions comprises heating the first and second beads to a temperature ranging from about 25 to about 125° C.

15. The method of claim 12, wherein first thixotropic thermoset material has the same composition as the second thixotropic thermoset material.

16. The method of claim 12. the first and/or second thermoset resin is selected from the group consisting of phenolic resins; lignin resins; tannin resins; amino resins; polyimide resins; isocyanate resins; (meth)acrylate resins; vinylic resins; styrenic resins; polyester resins; melamine resins; vinyl ester resins; maleimide resins; epoxy resins; polyamidoamine resins; and mixtures thereof; and wherein the first and/or second rheology control agent comprises fumed silica, organoclays, polysaccharides, cellulose and derivatives thereof.

* * * * *